J. E. NORWOOD.
VEHICLE CASTER.
APPLICATION FILED DEC. 20, 1909.
973,690.
Patented Oct. 25, 1910.
2 SHEETS—SHEET 1.
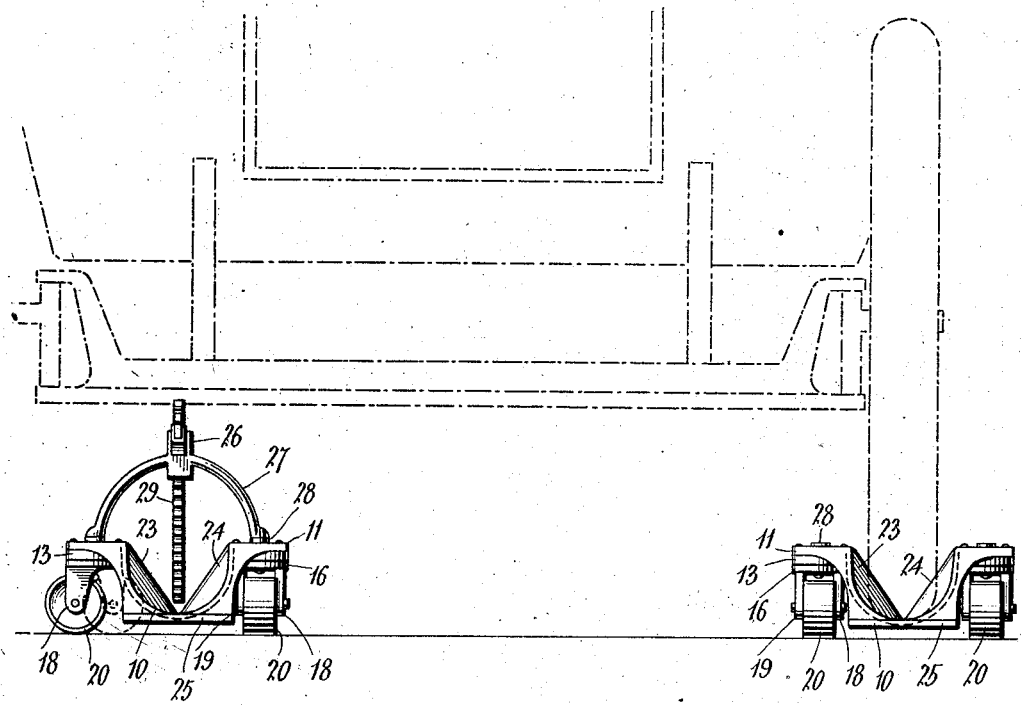
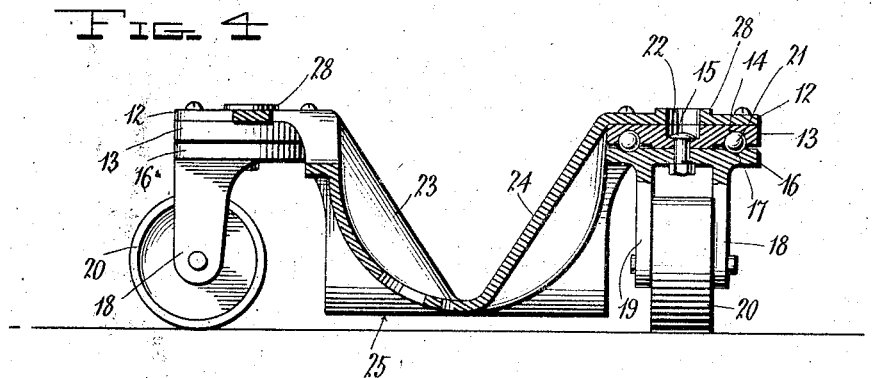
Witnesses
Inventor
J. E. Norwood
By
Attorneys

J. E. NORWOOD.
VEHICLE CASTER.
APPLICATION FILED DEC. 20, 1909.

973,690.

Patented Oct. 25, 1910.
2 SHEETS—SHEET 2.

Witnesses

Inventor
J. E. Norwood
By
Attorneys

UNITED STATES PATENT OFFICE.

JOHN E. NORWOOD, OF BALTIMORE, MARYLAND.

VEHICLE-CASTER.

973,690.

Specification of Letters Patent. Patented Oct. 25, 1910.

Application filed December 20, 1909. Serial No. 534,086.

*To all whom it may concern:*

Be it known that I, JOHN E. NORWOOD, a citizen of the United States, residing in the city of Baltimore, State of Maryland, have invented certain new and useful Improvements in Vehicle-Casters; and I do hereby declare the following to be a full, clear, and exact description of the invention, such as will enable others skilled in the art to which it appertains to make and use the same.

This invention relates to vehicle casters.

The object of the invention is the production of a device of the character named which is adapted to support vehicles either with or without the wheels applied thereto and enable same to be moved within a much smaller area than can be done by the ordinary propelling and steering of the vehicle.

To this end the invention comprises a base having a swiveled connection with its supporting wheels whereby said base may be moved in any direction; the upper face of said base being suitably dished to receive and support a vehicle wheel, while a suitable supporting element is detachably carried thereby to enable the caster to operatively support the vehicle through the instrumentality of the engagement of said supporting element with the axle thereof.

With these and other objects in view the invention consists in the details of construction and in the arrangement and combination of parts to be hereinafter more fully described and set forth in the claims.

Figure 2:
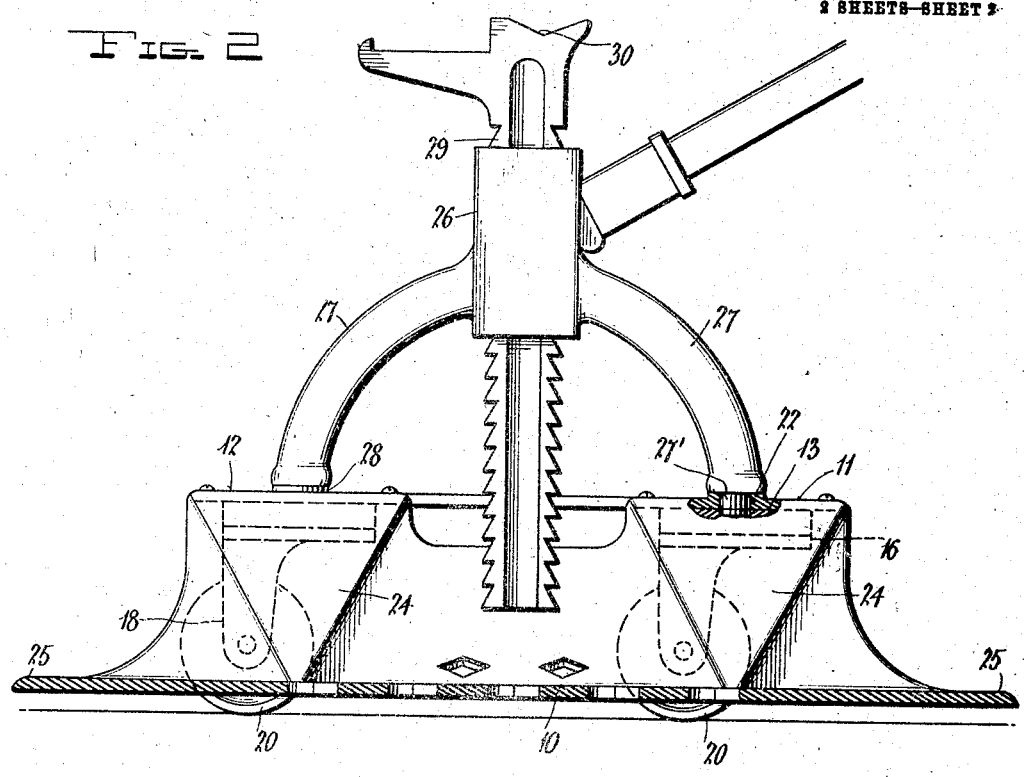
Figure 3:
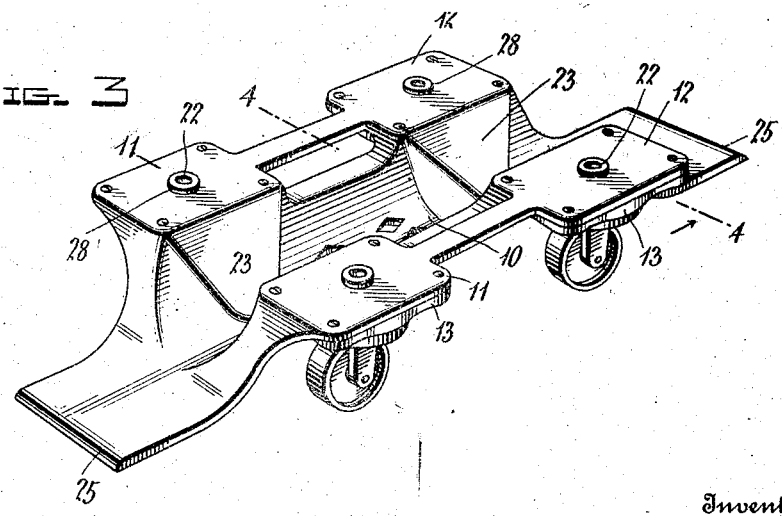

In describing the invention in detail reference will be had to the accompanying drawings in which like characters of reference denote corresponding parts in the several views, and in which, Figure 1 is a partial front elevation of an automobile showing a wheel at one end of the front axle supported by the caster with the detachable supporting element thereof removed and also the front axle of the automobile supported by the caster at its other end through the instrumentality of the supporting element which engages the axle; Fig. 2, a longitudinal section of the caster with the detachable supporting element applied thereto; Fig. 3, a detail perspective view of the caster with the supporting element removed therefrom; and, Fig. 4, a section on the line 4—4 of Fig. 3.

Referring to the drawings, the improved caster is shown as comprising a base formed of an integral casting having a central longitudinal dished portion 10 provided at one end of each upper edge with laterally projecting ears 11, while corresponding ears 12 project laterally from the opposite end of each of said upper edges. Each of the ears 11 and 12 has secured to its lower face a plate 13, the under side of which is provided with an annular groove 14. Disposed beneath the plate 13 and rotatably connected therewith by a swivel pin 15 is another plate 16 provided with an annular groove 17 in its upper side in vertical alinement with the groove 14 of the plate 13. Depending from the plate 16 is a pair of spaced ears 18 and 19 between which is journaled in a suitable manner a caster wheel 20. Disposed between the groove 14 and the groove 17 of the plates 13 and 16 respectively are a plurality of steel balls 21 which form anti-friction bearings to permit the plate 16 and the caster wheel carried thereby to swivel easily on the pin 15. The ears 11 and 12 are provided with apertures 22 disposed in vertical alinement above the swivel pin 15. These apertures 22 are adapted to receive projections on the supporting legs of a lifting member to be presently described.

The sides of the dished portion 10 are bulged inwardly at corresponding spaced points in their length to form the projections 23 and 24 respectively; said projections diverging upwardly from nothing at the base of the dished portion 10 and also increasing in depth as the upper edges of the sides of the portion 10 are approached. Each of the projections 23 and 24 are positioned in transverse alinement with the caster wheel mounting disposed adjacent thereto so that the cavity formed in the outer face of the side of the dished portion, as a result of bulging said side inwardly to form the projections 23 and 24 will be adapted to receive a part of the caster wheel mounting during a portion of its movement when rotated upon the swivel pin 15. The construction just described enhances the compactness of the structure of the base portion of the caster as it permits the caster wheel mounting to be brought inward toward the dished portion of the face and at the same time permits said mounting to turn completely around on the swivel pin 15 without coming into engagement with the sides of said dished portion. The projections 23 and 24 of the device serve to maintain the tired wheel of an automobile against relative movement with respect to said base when said wheel is supported in the dished portion 10 and disposed between the projections 23 and 24. The inner diverging edges of said projections serve to grip the tire on the sides so as to prevent its accidental displacement from the caster; said gripping of the tire, however, not being of sufficient strength to prevent the wheel from being rolled off the caster when desired, with the application of a little additional force.

In order to permit a wheel to be easily forced into the dished portion 10 of the caster each end thereof is provided with an extending lip 25; said lips and the longitudinal center of the dished portion 10 being disposed in a common horizontal plane as illustrated in Fig. 2. By tilting the base on either end it will be obvious that a wheel may be easily forced upward on the lip 25 and into the dished portion 10 so as to be disposed between the projections 23 and 24.

The supporting element of the caster comprises a supporting member formed of a socket section 26 provided with radiating depending legs 27 each of which have formed on their ends a lug 28 adapted to fit in the apertures 22 of the ears 11 and 12, said apertures being increased in depth by a boss 28 surrounding same. Mounted for vertical travel in the socket portion 26 is a supporting member 29 having a socket 30 in its upper end for engagement with the axle of the vehicle. The supporting member 29 is raised and lowered either after the fashion of an ordinary jack or by means of a handle and bracket arm 29ᵃ, the lower end of said member moving in proximity to the bottom of the dished portion 10 of the base at the limit of its downward movement, thus enabling considerable range of movement of said supporting member while at the same time keeping the combined height of the wheeled base and supporting element of the caster within a comparatively small limit. It will also be obvious that when the supporting member is detached and used independently of the wheeled base the radiating depending legs 27 will maintain the supporting element stable against the influence of a tilting stress, and it will be further obvious that as the strain, when the supporting member is used in conjunction with the wheeled base, is applied directly over the swivel of the caster wheel mountings a possible tilting of said base during its use is provided against.

What is claimed is:—

1. In a vehicle caster, a base having outstanding side flanges and a longitudinal channel, the latter to accommodate a vehicle wheel tire, the sides of said channel being formed with projections extending into said channel from opposite sides thereof.

2. In a vehicle caster, the combination of a wheeled base having means to receive a vehicle wheel tire, and a supporting member, said base and said supporting member having means to detachably secure the latter on the former.

3. In a vehicle caster, the combination of a wheeled base having means to receive a vehicle wheel tire, and a supporting member, said base and said supporting member having means to detachably secure the latter on the former, said supporting member also having means to support the same against tilting stress either when said supporting member is on or detached from said base.

4. In a vehicle caster, a base having outstanding side flanges and a longitudinal channel, the latter to accommodate a vehicle wheel tire, the sides of said channel being formed with projections extending into said channel from opposite sides thereof and further formed with recesses in the outer sides of said projections and casters under and over-hung by said side flanges and disposed opposite and cleared by said recesses.

5. In a vehicle caster, the combination of a wheeled base, having a longitudinal channel to receive a vehicle wheel tire and a supporting member, said supporting member comprising a vertically movable member and a socket member in which said vertically movable member is mounted, said socket member having radially disposed legs extending therefrom, said legs and said wheeled base having means to detachably mount said legs and hence also said supporting member on the said wheeled base.

6. In a vehicle caster, the combination of a wheeled base having a longitudinal channel to receive a vehicle wheel tire and lips projecting from the ends of the base to dirice the wheel tire into or out of the said channel, and a supporting member, said base being fitted to accommodate the vehicle tire and the said supporting member interchangeably.

In testimony whereof, I affix my signature, in presence of two witnesses.

JOHN E. NORWOOD.

Witnesses:
  CURTIS O. TYSON,
  WILLOUGHBY HALL.